(12) United States Patent
Dalsgaard et al.

(10) Patent No.: US 8,554,221 B2
(45) Date of Patent: Oct. 8, 2013

(54) SYSTEM AND METHOD FOR NON-CONTENTION BASED HANDOVER BASED ON PRE-RESERVED TARGET CELL UPLINK ALLOCATIONS IN COMMUNICATION SYSTEMS

(75) Inventors: Lars Dalsgaard, Oulu (FI); Benoist Sebire, Tokyo (JP); Jarkko T. Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 453 days.

(21) Appl. No.: 12/526,651

(22) PCT Filed: Mar. 6, 2008

(86) PCT No.: PCT/IB2008/050826
§ 371 (c)(1), (2), (4) Date: Apr. 29, 2010

(87) PCT Pub. No.: WO2008/107856
PCT Pub. Date: Sep. 12, 2008

(65) Prior Publication Data
US 2010/0202402 A1    Aug. 12, 2010

Related U.S. Application Data

(60) Provisional application No. 60/905,542, filed on Mar. 7, 2007.

(51) Int. Cl.
*H04W 36/00* (2009.01)
(52) U.S. Cl.
USPC .......... 455/436; 455/438; 455/439; 455/450; 455/453
(58) Field of Classification Search
USPC .............. 455/436, 437, 438, 440, 442, 67.11, 455/67.13, 226.1, 226.2, 226.3, 439, 450, 455/453
See application file for complete search history.

(56) References Cited

U.S. PATENT DOCUMENTS 5,394,158 A  *  2/1995  Chia .............................. 342/457
5,828,661 A  *  10/1998  Weaver et al. ................. 370/331
(Continued)

FOREIGN PATENT DOCUMENTS

JP          2003304566 A     10/2003

OTHER PUBLICATIONS

International Search Report and Written Opinion of the International Searching Authority from PCT Application No. PCT/IB2008/050826, dated Aug. 28, 2008, 6 pages.

(Continued)

*Primary Examiner* — Temica M Beamer
(74) *Attorney, Agent, or Firm* — Harrington & Smith (57) ABSTRACT

In accordance with aspects of the present invention, a method, apparatus and system for non-contention based handover based on pre-reserved target cell uplink allocations in communication systems. In one embodiment, the apparatus includes a transceiver (760) configured to communicate with a source base station and a data processor (750) coupled to the transceiver (760). The data processor (750) is configured to produce a measurement report based on a signal received from the source base station, initiate transmission of the measurement report to the source base station, process a handover command received from the source base station, and enable transmission of access bursts to a target base station in a reserved window of time on an uplink shared channel.

20 Claims, 9 Drawing Sheets

(56) References Cited

U.S. PATENT DOCUMENTS

| | | | |
|---|---|---|---|
| 6,181,941 B1 | 1/2001 | McCarthy | |
| 6,192,245 B1 * | 2/2001 | Jones et al. | 455/437 |
| 6,242,638 B1 * | 6/2001 | Lin et al. | 560/130 |
| 6,611,688 B1 * | 8/2003 | Raith | 455/456.1 |
| 7,047,009 B2 * | 5/2006 | Laroia et al. | 455/437 |
| 2003/0007466 A1 * | 1/2003 | Chen | 370/328 |
| 2007/0161374 A1 * | 7/2007 | Kienstra et al. | 455/436 |

OTHER PUBLICATIONS

Tdoc-R2-070268; 3GPP TSG RAN WG2 #56bis; Jan. 15-19, 2007, Sorrento, Italy; Agenda item: 5.2.2; Source: NTT DoCoMo, Inc.; Title: *RACH budget and delay analysis* (5 pages + Appendix 1 and 2).

R2-070486; TSG-RAN Working Group 2 meeting #57; St Louis, USA, Feb. 12-16, 2007; Source: ZTE; Title: *Some signaling aspect of intra-LTE handover procedure*; Agenda item: 11.5.1 (5 pages).

R2-070778; 3GPP TSG-RAN WG2 #57; Feb. 12-16, 2007, Saint-Louis, USA; Agenda item: 11.4; Source: NTT DoCoMo, Inc.; Title:Contention-based and Contention-free Access Procedures in LTE (3 pages).

3GPP TS 36.300 V1.0.0 (Mar. 2007) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (82 pages).

* cited by examiner

SYSTEM AND METHOD FOR NON-CONTENTION BASED HANDOVER BASED ON PRE-RESERVED TARGET CELL UPLINK ALLOCATIONS IN COMMUNICATION SYSTEMS

RELATED APPLICATION

This application was originally filed as PCT Application No. PCT/IB2008/050826 filed 6 Mar. 2008 and claims priority to U.S. Application No. 60/905,542 filed on 7 Mar. 2007.

This application claims the benefit of U.S. Provisional Application No. 60/905,542, entitled "System and Method for Non-Contention Based Handover Based on Pre-Reserved Target Cell Uplink Allocations in Communication Systems," filed on Mar. 7, 2007, which is incorporated herein by reference.

TECHNICAL FIELD

The present invention is directed, in general, to communication systems and, in an exemplary embodiment, to a system and method for performing handover in a communication system.

BACKGROUND

The communication of information is a necessity of modern society, which is enabled through the operation of a communication system. Information is communicated between a sending station and a receiving station by way of a communication channel. The sending station converts the information into a form for communication over the communication channel. The receiving station detects and recovers the information for the benefit of a user. A wide variety of different types of communication systems have been developed and are regularly employed to effectuate communication between sending and receiving stations.

An exemplary communication system is a cellular communication system in which a communication channel is defined upon a radio link extending between sending and receiving stations. Cellular radio communication systems are amenable to implementation as mobile communication systems wherein radio links, rather than fixed, wireline connections, are employed to define communication channels.

Generally, a cellular communication system includes a network infrastructure that includes a plurality of base stations that are positioned at spaced-apart locations throughout a geographic area. Each of the base stations defines an area, referred to as a cell, from which the cellular communication system derives its name. The network infrastructure, of which the base stations form portions thereof, is coupled to a core network such as a packet data backbone or a public-switched telephone network. Communication devices such as computer servers, telephone stations, etc., are, in turn, coupled to the core network and are capable of communication by way of the network infrastructure and the core network. Portable transceivers, commonly referred to as user equipment or mobile stations, communicate with the base stations by way of such radio links.

As wireless communication systems such as cellular telephone, satellite, and microwave communication systems become widely deployed and continue to attract a growing number of users, there is a pressing need to accommodate a large and variable number of communication systems transmitting the growing volume of data with a fixed resource, such as a fixed channel bandwidth, to accommodate a fixed data packet size. Traditional communication system designs employing a fixed resource (e.g., a fixed data rate for each mobile station) have become challenged to provide high, but flexible, data transmission rates in view of the rapidly growing customer base.

As a user equipment is moved through the physical area served by a wireless communication system (e.g., as a user equipment is transported in a moving vehicle), it is frequently necessary to reassign communication resources with their limited availability for the user equipment from a source base station to a target base station that provides better signal coverage for the new location. The user equipment has already been assigned uplink resources on the packet uplink shared channel ("UL-SCH") to perform the necessary communication functions with the source base station by a packet scheduler in the source base station. To continue communication with the target base station, new uplink resources are assigned by the target base station for use by the user equipment.

In system arrangements of the past, initiation of the uplink transmission by a target base station is performed by a user equipment using a contention-based access arrangement on an uplink random access channel ("RACH"), which is (statically) reserved for the particular purpose of user equipment transmitting the access bursts. Access bursts are initially transmitted to the target base station by the user equipment to allow the target base station to measure uplink communication parameters such as transmission delay, signal amplitude, and other parameters that may be needed by the target base station to establish a reliable uplink for the user equipment. Transmission of access bursts from different user equipment is inherently unsynchronized in such communication systems. Accordingly, one or more user equipment during handover, or even when initiating a new communication with a base station, may transmit access bursts that arrive simultaneously at a target base station with access bursts of another user equipment, thereby causing a signal collision event.

The use of a contention-based handover procedure based on a random access channel presents an unresolved issue in the currently envisioned Third Generation Partnership Project ("3GPP") evolved universal mobile telecommunications system terrestrial radio access network ("e-UTRAN"). Disadvantages of contention-based handover include, among other system performance issues, possible handover delay between base stations, handover interrupt time or gap, and the overall questions regarding reliability and repeatability of the handover process. Contention-based handover may also introduce limitations on the scheduling of RACH resources in the communication system. Planning of the RACH may also become more complex when contention-based handover is employed. Thus, a non-contention based handover would advantageously provide a number of benefits over a contention-based handover.

Considering the limitations of a contention-based handover as described above, a system and method to assign communication resources to user equipment for operation in the serving area of a target base station to execute a non-contention-based handover to a target base station is not presently available, thereby incurring many of the aforementioned limitations. In accordance therewith, a non-contention-based handover system and method in a communication system employing a plurality of base stations would provide improved resource utilization and communication efficiency.

SUMMARY OF THE INVENTION

These and other problems are generally solved or circumvented, and technical advantages are generally achieved, by embodiments of the present invention, which include a method, apparatus, and system for coordinating allocation of resources for user equipment to be handed over from a source base station to a target base station without contention. In one embodiment, the apparatus (e.g., user equipment) includes a transceiver configured to communicate with a source base station and a data processor coupled to the transceiver. The data processor is configured to produce a measurement report based on a signal received from the source base station, initiate transmission of the measurement report to the source base station, process a handover command received from the source base station, and enable transmission of access bursts to a target base station in a reserved window of time on an uplink shared channel.

In another aspect, the present invention provides an apparatus (e.g., a target base station) including a packet scheduler configured to determine if the apparatus has sufficient resources to accommodate user equipment and reserve a window of time on an uplink shared channel for the user equipment to transmit access bursts. The apparatus also includes a handover subsystem configured to transmit a message to a source base station confirming handover of the user equipment associated therewith.

In another aspect, the present invention provides a communication system including a source base station and a target base station. The source base station includes a measurement report handler configured to process a measurement report from user equipment, and a handover subsystem configured to select a target base station for a handover of the user equipment and to generate a handover request for the user equipment to the target base station. The target base station includes a packet scheduler configured to determine if the target base station has sufficient resources to accommodate the user equipment and reserve a window of time on an uplink shared channel for the user equipment to transmit access bursts. The target base station also includes a handover subsystem configured to transmit a message to the source base station confirming a handover of the user equipment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context of coordinating allocation of resources for user equipment to be handed over from a source base station to a target base station without contention and without a need for sharing timing information therebetween. In general, embodiments of the invention may be applied to any form of communication system and network such as a cellular wireless communication system and network.

The Third Generation Partnership Project Long Term Evolution ("3GPP LTE") is the name generally used to describe an ongoing effort across the industry to improve the universal mobile telecommunications system ("UMTS") for mobile communications to cope with continuing new requirements and the growing base of users. Goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS.

Figure 1:
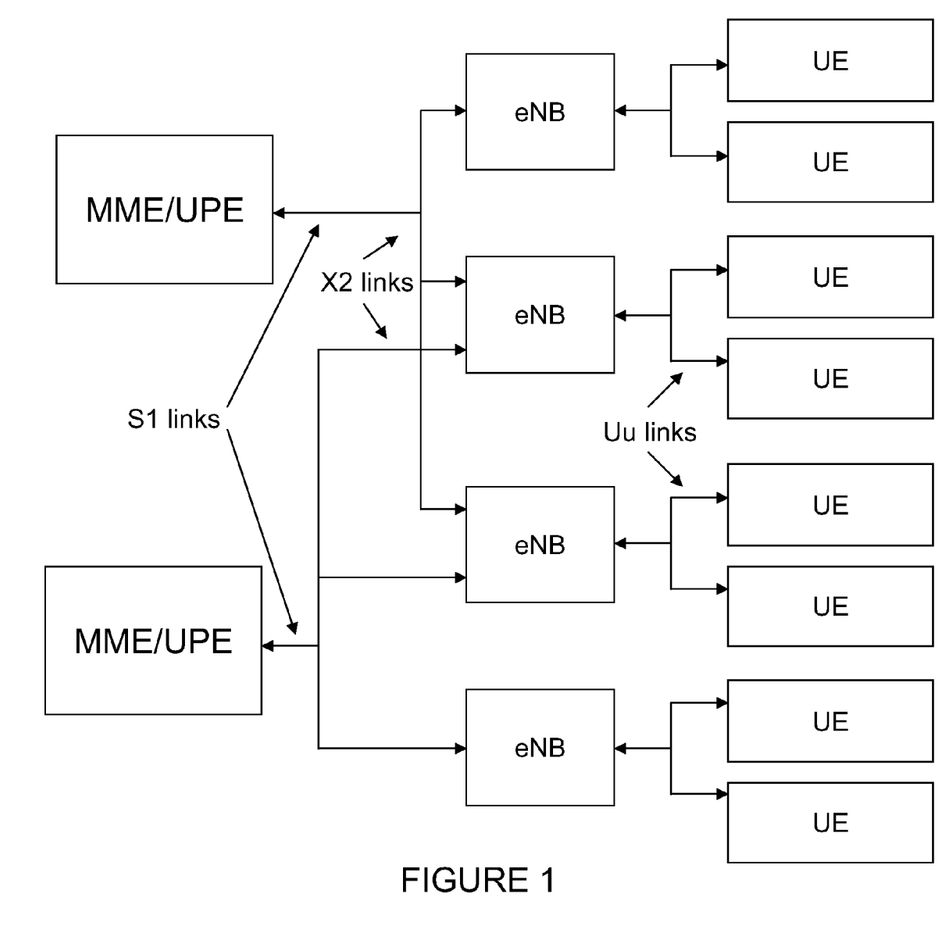
FIGS. 1 to 4 illustrate system level diagrams of communication systems including wireless communication systems that provide an environment for application of the principles of the present invention.

Referring initially to FIG. 1, illustrated is a system level diagram of a communication system including a wireless communication system that provides an environment for application of the principles of the present invention. The wireless communication system may be configured to provide e-UTRAN universal mobile telecommunications services. Mobile management entities ("MMEs") and user plane entities ("UPEs") provide control functionality for an e-UTRAN node B (designated "eNB," an "evolved node B," also referred to as a "base station") via an S1 communication link. The base stations communicate via an X2 communication link. The various communication links are typically fiber, microwave, or other high-frequency metallic communication paths such as coaxial links, or combinations thereof.

The base stations communicate with user equipment (designated "UE"), which is typically a mobile transceiver carried by a user. Thus, communication links (designated "Uu" communication links) coupling the base stations to the user equipment are air links employing a wireless communication signal such as a 1.8 GHz orthogonal frequency division multiplex ("OFDM") signal.

Figure 2:
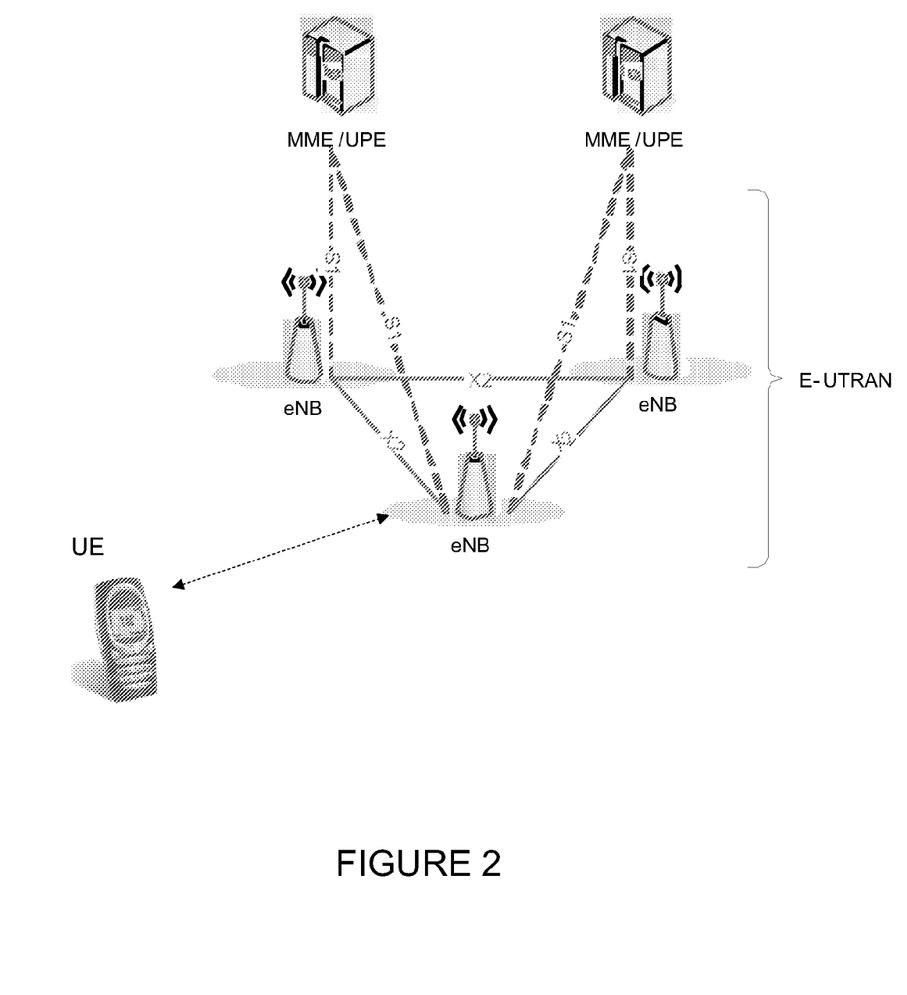

Turning now to FIG. 2, illustrated is a system level diagram of a communication system including a wireless communication system that provides an environment for the application of the principles of the present invention. The wireless communication system provides an e-UTRAN architecture including evolved base stations (designated "eNBs") providing evolved universal mobile telecommunications system terrestrial radio access user plane (packet data convergence protocol/radio link control/media access control/physical) and control plane (radio resource control) protocol terminations towards user equipment (designated "UE"). The base stations are interconnected with an X2 interface or communication link. The base stations are also connected by an S1 interface or communication link to an evolved packet core ("EPC") including, for instance, a mobility management entity ("MME") and a user plane entity ("UPE"), which may form an access gateway ("aGW," a system architecture evolution gateway). The S1 interface supports a multiple entity relationship between the mobility management entities/user plane entities and the base stations and supports a functional split between the mobility management entities and the user plane entities. For applications supporting inter-public land mobile network handover, LTE_ACTIVE inter-eNB mobility is supported by the mobility management entities/user plane entities relocation via the S1 interface.

The base stations may host functions such as radio resource management (e.g., internet protocol ("IP") header compression and encryption of user data streams, ciphering of user data streams, radio bearer control, radio admission control, connection mobility control, and dynamic allocation of resources to user equipment in both the uplink and the downlink), selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobility management entity/user plane entity may host functions such distribution of paging messages to the base stations, security control, termination of U-plane packets for paging reasons, switching of U-plane for support of the user equipment mobility, idle state mobility control and system architecture evolution bearer control. The user equipment receives an allocation of a group of information blocks from the base stations.

Figure 3:
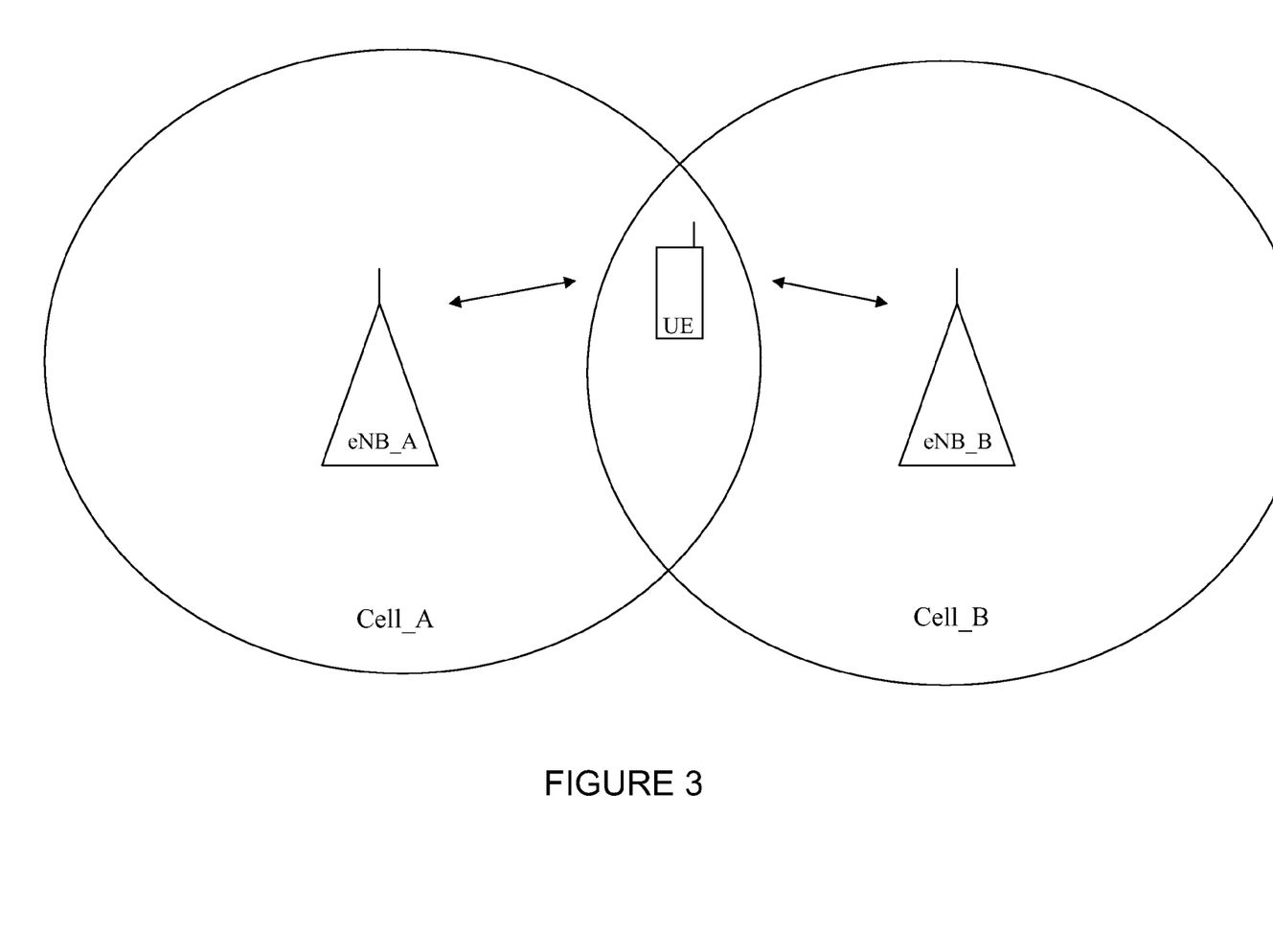

Turning now to FIG. 3, illustrated is a system level diagram of a wireless communication system that provides an environment for the application of the principles of the present invention. In the illustrated embodiment, the wireless communication system is a cellular communication system that includes first and second base stations eNB_A, eNB_B and a user equipment UE. As illustrated herein, each base station eNB_A, eNB_B covers a cell designated Cell_A for the first base station eNB_A and Cell_B for the second base station eNB_B. In a multicell environment, the UE may receive a signal from one or more neighboring cells. The wireless communication system as illustrated in FIG. 3 is frequently employed to provide high data-rate communication services such as video transmissions as well as large quantities of raw data from user-generated files. Those skilled in the art should also understand that the user equipment may take the form of a mobile station including a cellular telephone, a personal digital assistant ("PDA") having wireless communication capabilities, a portable computer having wireless communication capabilities, an image capture device such as digital cameras having wireless communication capabilities, a gaming device having wireless communication capabilities, music storage and playback appliances having wireless communication capabilities, internet appliances permitting wireless internet access and browsing, as well as portable units or terminals that incorporate combinations of such functions.

During a handover event ("HO"), a first base station eNB_A may be considered a source base station (i.e., the base station or cell to which the user equipment UE is currently connected and communicating in an associated serving cell). The second base station eNB_B may be considered a target base station (i.e., the base station to which the user equipment UE is to be connected and communicating with in the target cell after the HO procedure is completed). The serving cell and the target cell may at least partially overlap one another in served area.

Figure 4:
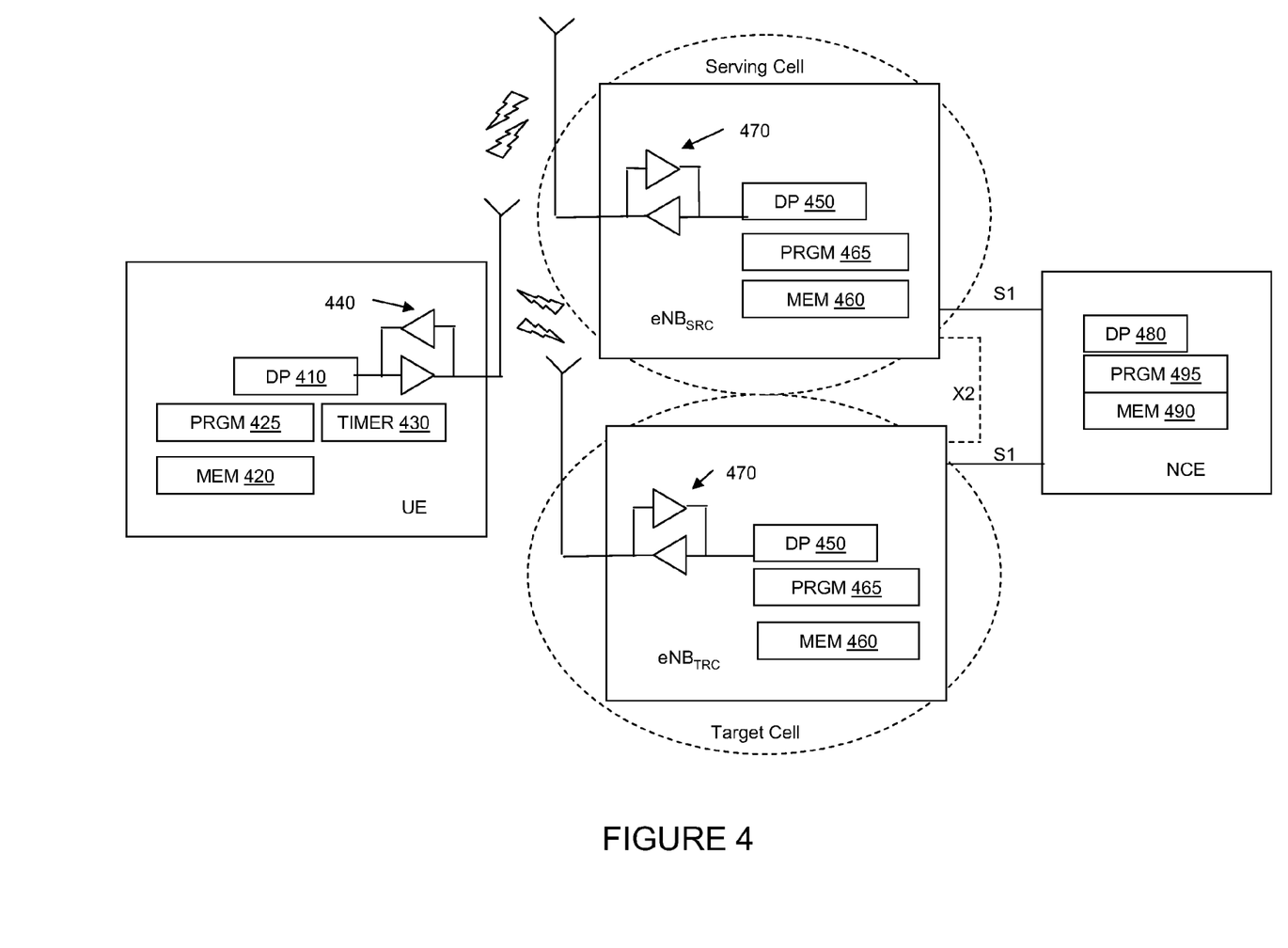

Turning now to FIG. 4, illustrated is a system level diagram of a wireless communication system that provides an environment for the application of the principles of the present invention. The wireless communication system includes user equipment (designated "UE") adapted to communicate with a source base station (designated "$eNB_{SRC}$") in a serving cell and a target base station (designated "$eNB_{TRG}$") in a target cell, which are coupled to a network control element (designated "NCE") such as an access gateway. The serving cell and the target cell may at least partially overlap. Prior to a handover event, the user equipment is connected to and communicates with the source base station. After the handover event, however, the user equipment is connected to and communicates with the target base station.

The user equipment includes a data processor 410 (designated "DP"), a memory 420 (designated "MEM") that stores programs 425 (designated "PRGM"), a timer 430 (designated "TIMER") and a radio frequency transceiver or transceiver 440 for bidirectional wireless communications with the base stations. The base stations include a data processor 450 (also designated "DP"), a memory 460 (also designated "MEM") that stores programs 465 (also designated "PRGM"), and a radio frequency transceiver or transceiver 470 for bidirectional wireless communications with the user equipment. Additionally, the network control element includes a data processor 480 (also designated "DP"), and a memory 490 (also designated "MEM") that stores programs 495 (also designated "PRGM"). In general, the base stations provide the e-UTRAN user plane (e.g., radio link control/media access control/physical) and control plane (e.g., radio resource control ("RRC")) protocol terminations toward the user equipment. The base stations communicate with the network control element via an S1 interface or communication link, and are interconnected via X2 interface or communication link.

The memory as introduced hereinabove may be of any type suitable to the local technical environment and may be implemented using any suitable data storage technology such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors ("DSPs") and processors based on a multi-core processor architecture, as non-limiting examples. The programs include program instructions that, when executed by the associated data processor, enable the electronic device to perform tasks as described herein. Exemplary embodiments of the system, subsystems and modules as described herein may be implemented at least in part by computer software executable by the data processors of the user equipment and base stations, or by hardware, or combinations thereof.

Figure 5:
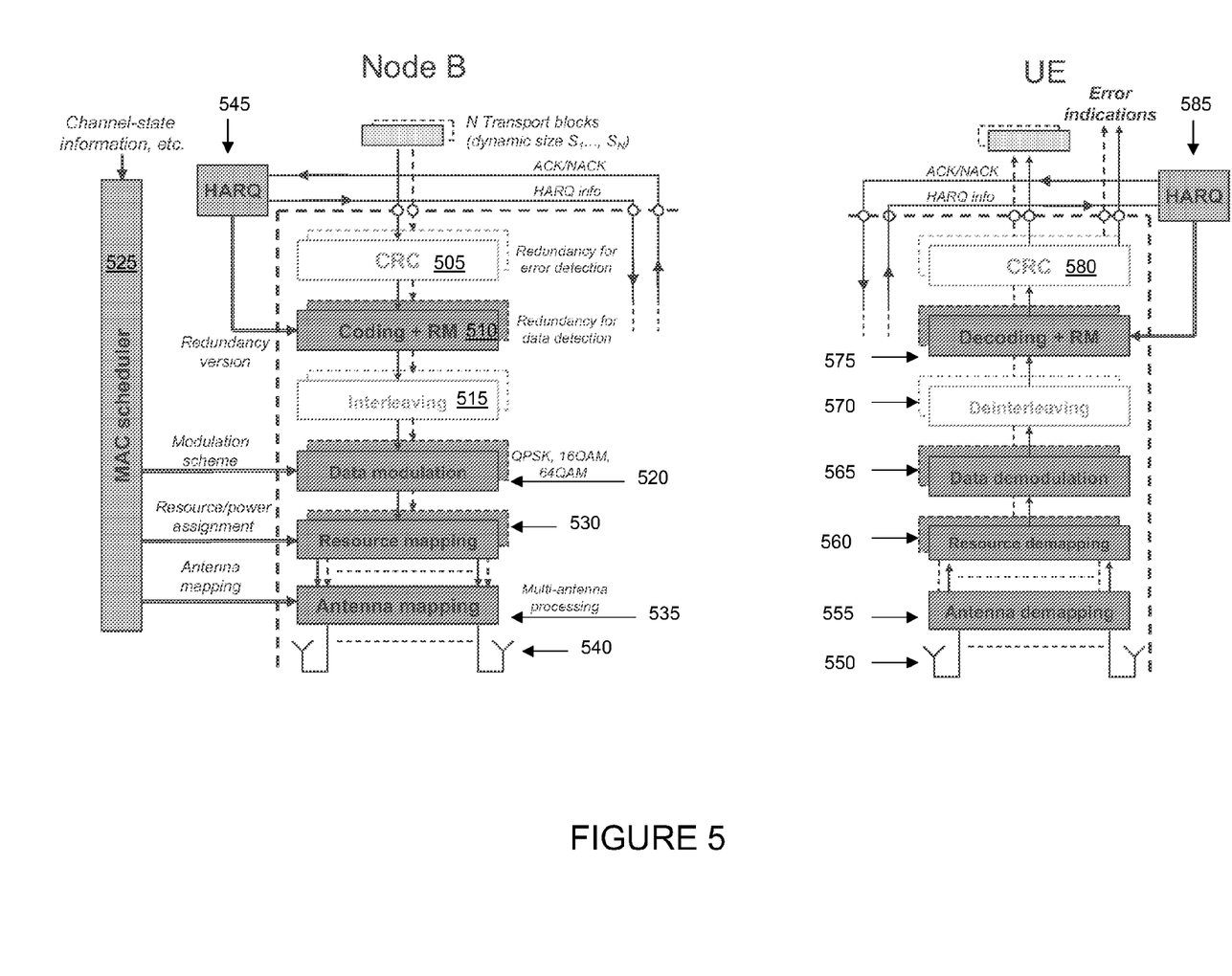
FIGS. 5 and 6 illustrate block diagrams of embodiments of a user equipment and a base station of a communication system in accordance with the principles of the present invention.
Figure 6:
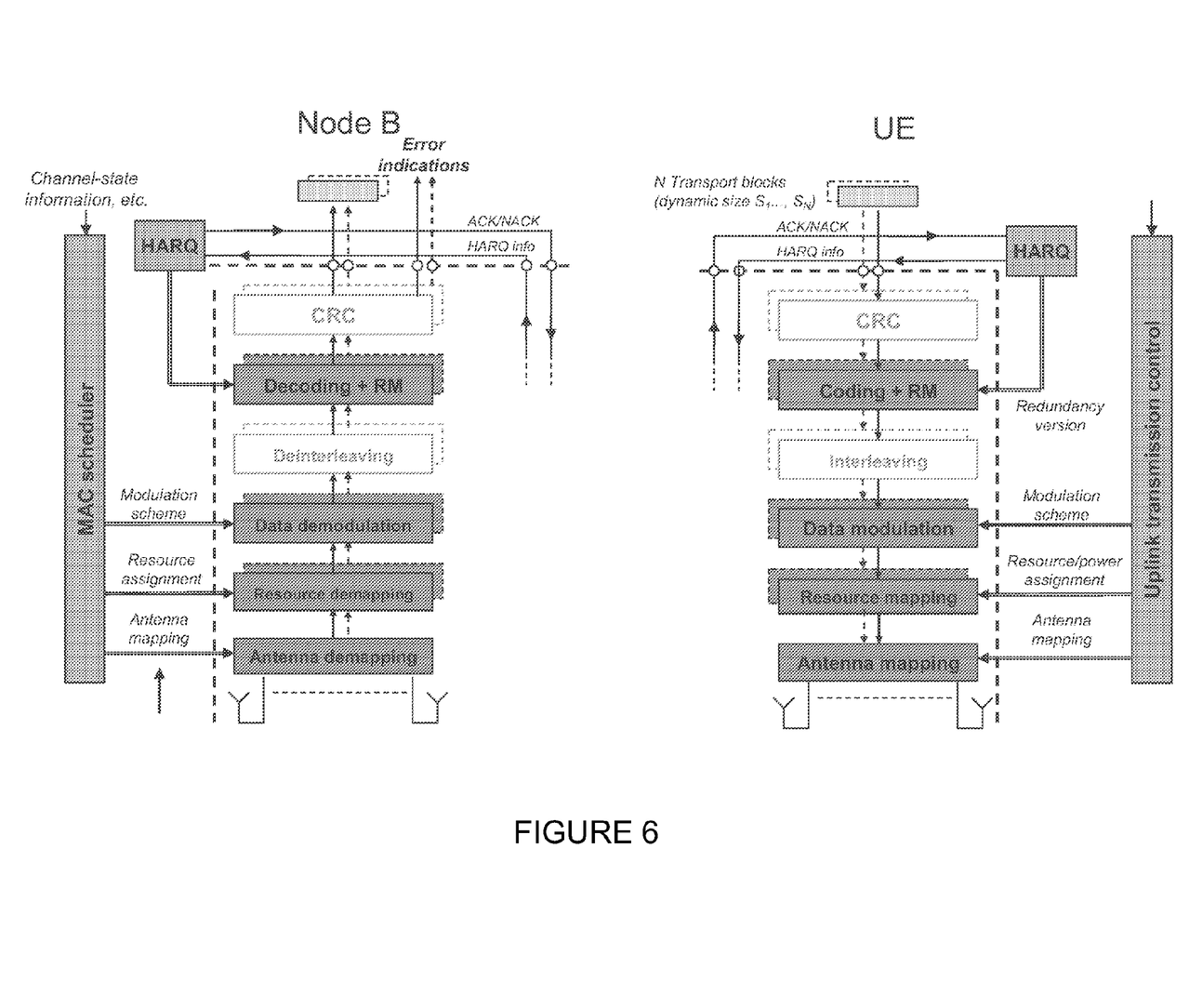

Turning now to FIGS. 5 and 6, illustrated are block diagrams of embodiments of a user equipment and a base station of a communication system in accordance with the principles of the present invention. The user equipment (designated "UE") and base station (designated "Node B") are compatible with 3GPP TS 36.300, referred to as the "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" V1.0.0 (2007-03), which is incorporated herein by reference. The illustrated communication system of FIG. 5 demonstrates downlink communication from the base station to the user equipment.

The base station receives transport information (designated "transport blocks") for user equipment and provides the transport information to a cyclic redundancy check module 505 (designated "CRC") for error detection. The transport information is thereafter provided to a coding module 510 (designated "Coding+RM") for performing coding and retransmission functions for the transport information.

An interleaving module 515 of the base station interleaves other information within the transport information. The base station also includes a data modulation module 520 for modulating the transport information using for instance, quadrature phase-shift keying or quadrature amplitude modulation as directed by a media access control ("MAC") scheduler 525. A resource mapping module 530 of the base station thereafter allocates resources for the user equipment in accordance with the transport information as directed by the media access control scheduler 525. An antenna mapping module 535 of the base station thereafter maps the transport information for antenna ports of an antenna 540 as directed by the media access control scheduler 525 to transmit the transport information over a wireless communication link to the user equipment. A hybrid automatic repeat request module 545 (designated "HARQ") cooperates with the coding module 510 to accommodate retransmissions.

The user equipment receives the transport information via an antenna 550, and an antenna demapping module 555 demaps the transport information from antenna ports of the antenna 550. A resource demapping module 560 demaps the resources allocated to the user equipment from the base station. A data demodulation module 565 demodulates the transport information and a deinterleaving module 570 of the user equipment deinterleaves the transport information transmitted from the base station. A decoding module 575 (designated "Decoding+RM") decodes the transport information using an opposite decoding process to the coding module 510 of the base station and supports retransmits from a hybrid automatic repeat request module 585 (designated "HARQ"). The transport information is thereafter provided to a cyclic redundancy check module 580 (designated "CRC") for error detection. FIG. 6 illustrates a block diagram of an embodiment of a UE and a base station in a wireless communication system, demonstrating allocation of resources for uplink communication from the user equipment to the base station.

Functionality performed by the user equipment may be organized as a stack of physical, transport, and control layers, including a media access control (also referred to as "MAC") layer. The media access control layer offers certain services to higher layers including services that are related to operation of an uplink (i.e., a channel for transmissions from user equipment to the base station).

The functionality performed by the user equipment may be organized and modeled as a stack of layers in accordance with the open system interconnection seven-layer model. Among the layers therein are a media access control layer and other layers located above the media access control layer such as networking and transport layers. The media access control layer offers certain services to the higher layers including services that are related to the operation of the uplink. The media access control layer includes an implementation of the uplink media access control protocol. The uplink media access control protocol provides procedures followed by the user equipment and the base station to transmit and receive using the uplink.

A physical layer is located below the media access control layer. The media access control layer requests certain services from the physical layer. These services are related to the physical transmission of packets to the base station. The media access control layer receives one or more flows from the higher layers. A flow is a stream of data, typically corresponding to a specific application such as a voice over internet protocol ("VoIP") communication session, videotelephony, gaming, or the like.

In order to communicate the physical layer packet format to user equipment, a compatible physical layer signaling or media access control channel signaling is generally employed. Each media access control layer packet section may include one or more media access control layer payloads in accordance with the media access control layer multi-user packet format.

A process providing non-contention based access as described herein is performed using uplink resources reserved for one or more user equipment for this purpose. The process provides a network in which such uplink transmissions from multiple user equipment initiating communication with a target base station do not result in a collision of received signals at the target base station.

A non-contention based handover procedure may employ knowledge of a timing difference between the base stations for the user equipment involved in a handover procedure, including the system frame number ("SFN") of the target base station. Obtaining the system frame number from a neighboring base station cannot always be readily performed in e-UTRAN, because the system frame number is typically not transmitted in the primary broadcast channel ("P-BCH"), recognizing that no space has been allocated in the primary broadcast channel therefor. Adding space for such data to the primary broadcast channel would add substantial overhead to the associated data payload. Transmitting a system frame number in a secondary broadcast channel ("S-BCH") would increase user equipment complexity in view of the expected secondary broadcast channel repetition rate, essentially mandating user equipment to constantly read the secondary broadcast channel of neighboring base stations, or parts thereof.

Therefore, a non-contention based handover procedure is introduced herein that avoids the need for the user equipment to obtain the system frame number data from a neighboring base station. A handover procedure is now described for a communication system including long term evolution that provides benefits from non-contention based handover, while also avoiding a need to know an accurate timing offset between a source and target base station.

In an example as described herein, a target base station in the handover procedure negotiates with the current source base station prior to execution of the handover of the user equipment from the source base station to the target base station. During negotiation, the target base station allocates a window in the uplink shared channel ("UL-SCH") to be used by the user equipment for transmitting an access burst when entering the base station. Besides reserving a window in the uplink shared channel, the target base station may additionally allocate an identifier for the user equipment [e.g., a cell-specific radio network temporary identifier ("C-RNTI")] to be used by the target base station to allocate communication resources for the user equipment. Additionally, the target base station may also estimate and transmit the uplink power to be used by the user equipment. The user equipment may also be assigned a dedicated preamble to be used in a RACH procedure in the target cell to avoid the contention based RACH procedure. By using the dedicated preamble, the RACH procedure is more or less non-contention based. The pre-amble may be reserved for a single user equipment for some period of time. The user equipment may then use the uplink shared channel reserved for RACH and send RACH bursts using dedicated preamble (e.g., the reserved resource is the dedicated preamble).

After the user equipment switches to the target base station, the user equipment uses the pre-allocated uplink shared channel in the target base station to transmit an access burst. The user equipment continues to transmit access bursts on the allocated uplink shared channel resource until acknowledgement is received from the base station, a timeout period expires or a predetermined number of access bursts has been transmitted. The principle of pre-allocating a window in an uplink shared channel in the target cell has thus been described.

Figure 7:
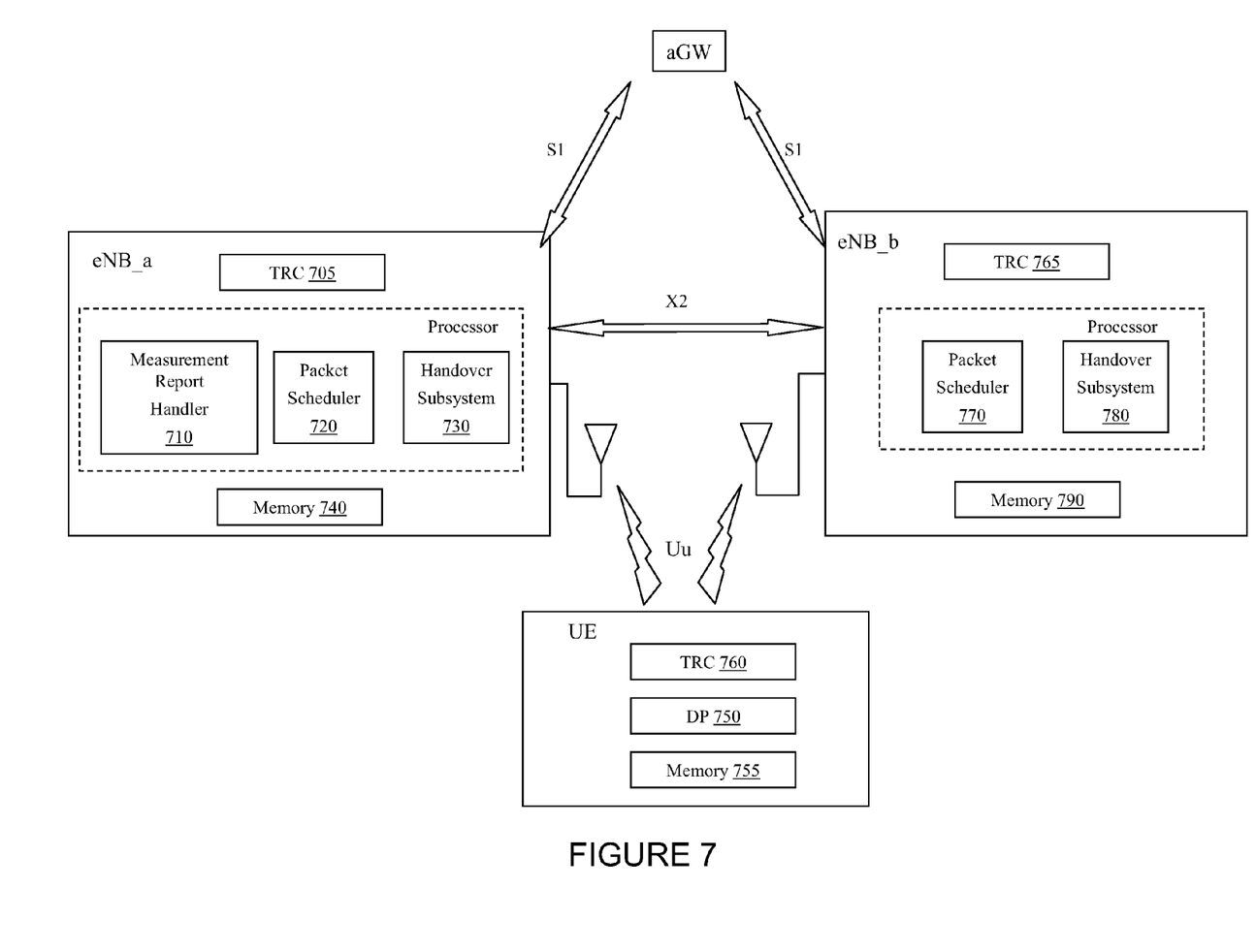
FIG. 7 illustrates a block diagram of an embodiment of user equipment and base stations of a communication system constructed in accordance with an embodiment of the present invention.

Turning now to FIG. 7, illustrated is a block diagram of an embodiment of user equipment and base stations of a communication system constructed in accordance with an embodiment of the present invention. A source base station (designated "eNB_a") is planning a handover of user equipment (designated "UE") to a target base station (designated "eNB_b"). The base stations are also connected to a core network through an access gateway (designated "aGW"). The source base station includes a transceiver 705 (designated "TRC"), a processor including a measurement report handler 710, a packet scheduler 720, a handover subsystem 730, and memory 740. The measurement report handler 710 in the source base station processes uplink data received from the user equipment such as received signal amplitude and signal transport delay. The packet scheduler 720 allocates uplink and downlink resources within the source base station. The handover subsystem 730 performs a handover decision algorithm based on input from, for instance, a measurement report handler 710, and uses resource and communication performance information to execute the handover of the user equipment to a target base station analogous to the description below with respect to FIG. 8. The memory 740 may be a nonvolatile memory associated with data processing in the source base station.

Thus, the user equipment produces and sends a measurement report in conjunction with a data processor 750 (designated "DP") and memory 755 via a transceiver 760 (designated "TRC") to a base station. The user equipment may be triggered or ordered to send the measurement reports periodically. The memory 755 may be a nonvolatile memory associated with data processing in the user equipment. The base station measurement report handler 710 processes the information and forwards it to a handover subsystem 730. A handover algorithm of the handover subsystem 730 decides the need for a handover. A packet scheduler 720 is then used for assigning downlink resources to the user equipment for transmitting a handover command.

The target base station includes a transceiver 765, a processor including a packet scheduler 770, a handover subsystem 780, and memory 790. The memory 790 may be a nonvolatile memory associated with data processing in the target base station. The packet scheduler 770 assures that the uplink shared channel resources are physically reserved for this user equipment and no other user equipment will be assigned the same uplink shared channel. If sufficient resources are available, the target base station pre-allocates a window on the uplink shared channel to be used by the incoming user equipment for transmitting uplink access bursts as performed by the packet scheduler 770. The target base station transmits a message confirming handover to the source base station including pre-allocation uplink information for the user equipment in accordance with the handover subsystem 780. The memory 790 cooperates with the aforementioned modules to perform the respective tasks.

Figure 8:
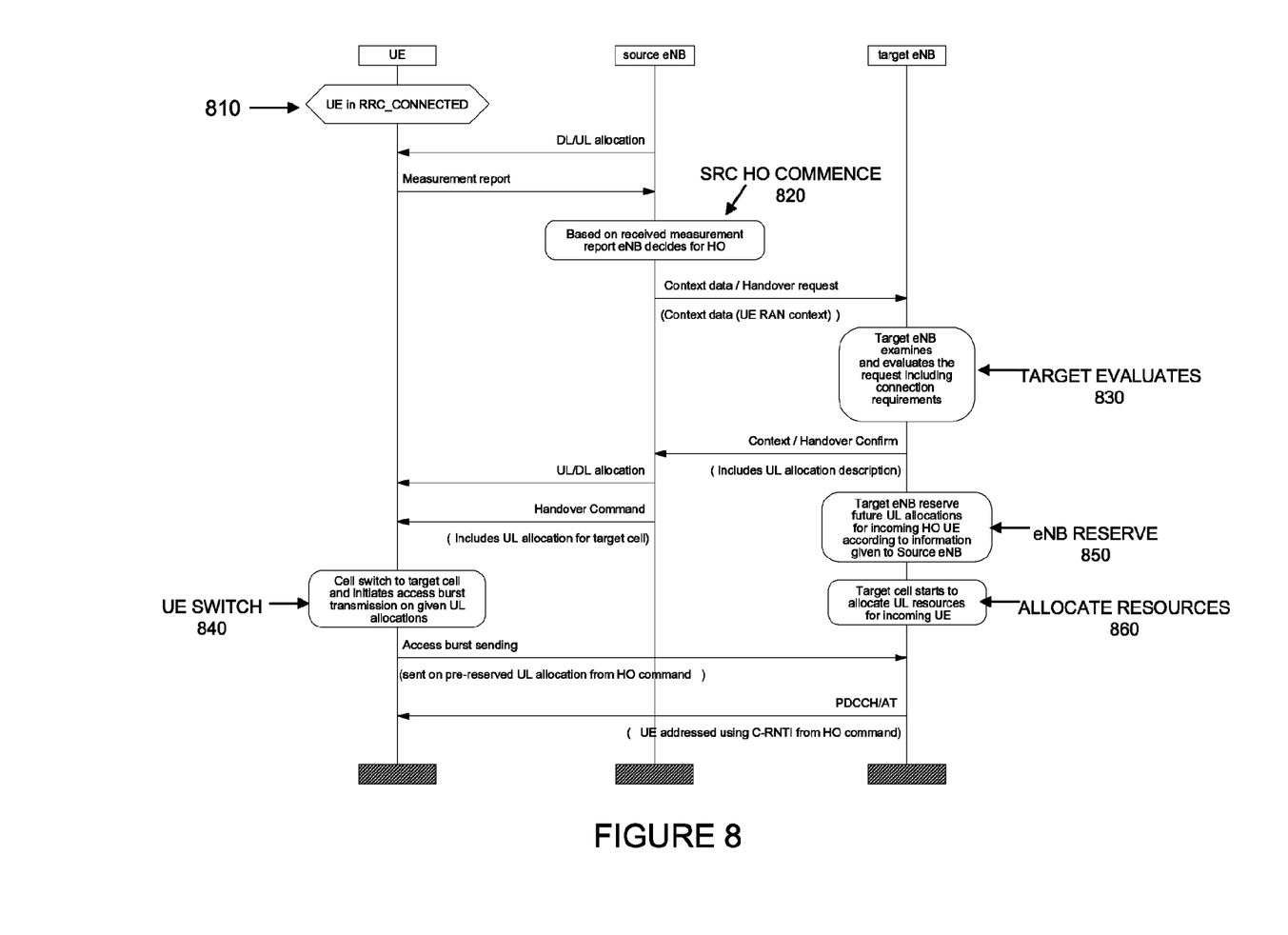
FIG. 8 illustrates a diagram demonstrating a process flow for a method of allocating a window in an uplink shared channel associated with a target base station in a wireless communication system constructed according to an embodiment of the present invention.

Turning now to FIG. 8 and with continuing reference to FIG. 7, illustrated is a diagram demonstrating process flow for a method of allocating a window in an uplink shared channel associated with a target base station in a wireless communication system constructed according to an embodiment of the present invention. The method is performed in a wireless communication system. The user equipment (designated "UE") camps on a source base station (designated "source eNB"), as indicated by a UE in the RRC_CONNECTED step 810, which refers to user equipment in radio resource control connected, using allocated downlink and uplink resources. The user equipment performs various scheduled measurements such as received signal amplitude and signal transport delay. Based on the measurements and event triggers given to the user equipment by the source base station, the user equipment may transmit a measurement report to the source base station. The handling or monitoring of a measurement trigger and event timeout may be handled in physical layer of the user equipment. The report may be built/constructed by a higher layer in the user equipment such as the media access control or radio resource control layer. The measurement report is processed by a measurement report handler 710 as illustrated in FIG. 7, which may trigger the source base station to start a handover procedure as indicated by a SRC HO COMMENCE step 820. Based on the measurement report and neighboring base stations/cells included in the report, the source base station selects an appropriate/possible/preferred base station or cell (referred to as the target base station and designated "target eNB") to which to hand over the user equipment.

The source base station transmits a handover request to the target base station in accordance with a handover subsystem 730 as illustrated in FIG. 7 and resident in the radio resource controller and radio resource manager of the base station. (See, e.g., FIG. 4.1 of 3GPP TS 36.300 mentioned above.) For purposes of clarity, the radio resource manager includes access control functions, quality of service functions, handover control functions, dynamic packet scheduling functions, hybrid automatic request retransmit functions and power control functions. The target base station then checks, as indicated by a TARGET EVALUATES step 830, to determine if the target base station has sufficient resources to accommodate another user equipment. A packet scheduler 770 of the target base station (see FIG. 7) in accordance with an admission control process assures that the uplink shared channel resources are physically reserved for this user equipment and no other user equipment will be assigned the same uplink shared channel. If sufficient resources are available, the target base station pre-allocates a window on the uplink shared channel to be used by the incoming user equipment for transmitting uplink access bursts as performed by the packet scheduler 770 as illustrated in FIG. 7 and resident in the radio resource controller and radio resource manager of the base station. The target base station may also allocate a cell-specific radio network temporary identifier ("C-RNTI"), an uplink power level to be used by the incoming user equipment or a dedicated preamble employable with a random access channel procedure in a target cell. The target base station transmits a message confirming handover to the source base station including pre-allocation uplink information for the user equipment in accordance with a handover subsystem 780 resident in the radio resource controller of the base station.

After the target base station has accepted the handover request from the source base station and has sent a handover confirm message to the source base station, the target base station packet scheduler is informed that a window of the uplink shared channel resources should be allocated for the purpose of transmitting access bursts using the given uplink allocations. The starting point of the window of the uplink shared channel resource allocation may also be at a specific time. Of course, the broad scope of the present invention is not limited to the foregoing.

The source base station receives the handover confirm message from the target base station including, among other data, information about the pre-allocated window of resources on the uplink shared channel for the target base station. Also, the cell-specific radio network temporary identifier and possibly the uplink power level to be used for the target base station are included in the message. The source base station forwards the information to the user equipment in a handover command message. Additionally, a packet scheduler allocates downlink resources for transmission of a message in a downlink to the user equipment.

When the user equipment receives the handover command, it immediately switches to the target base station, as indicated by a UE SWITCH step 840. The user equipment directly and without usage/reading of an allocation table ("AT") or a physical downlink control channel ("PDCCH"), starts transmission of access bursts on the allocated uplink shared channel with the possibly given power level. After the user equipment is ready for transmission to the target base station, a radio resource control or media access control process initiates an access burst transmission. The physical layer in the user equipment need not be informed about which resources are assigned for sending the access burst as the information is already available and received through the source base station via the handover command. In FIG. 6, a resource mapping module maps the access burst to a physical resource.

As indicated by an eNB RESERVE step 850, the target base station may reserve future uplink allocations for incoming handover of user equipment according to information given to a source base station. As indicated by ALLOCATE RESOURCES step 860, the target base station initiates allocation of further uplink resources for the incoming user equipment as performed by a packet scheduler 770 (see FIG. 7).

The user equipment continues to transmit access bursts on the given uplink shared channel until either a given timeout period expires, a maximum number of access bursts has been transmitted without an answer from the network, or an answer or acknowledgement is received from the network. An answer from the network (not shown) could be a further allocation for the user equipment given on the allocation table/physical downlink control channel ("AT/PDCCH") using the given the cell-specific radio network temporary identifier from the handover command (which was pre-allocated during the handover negotiation).

Figure 9:
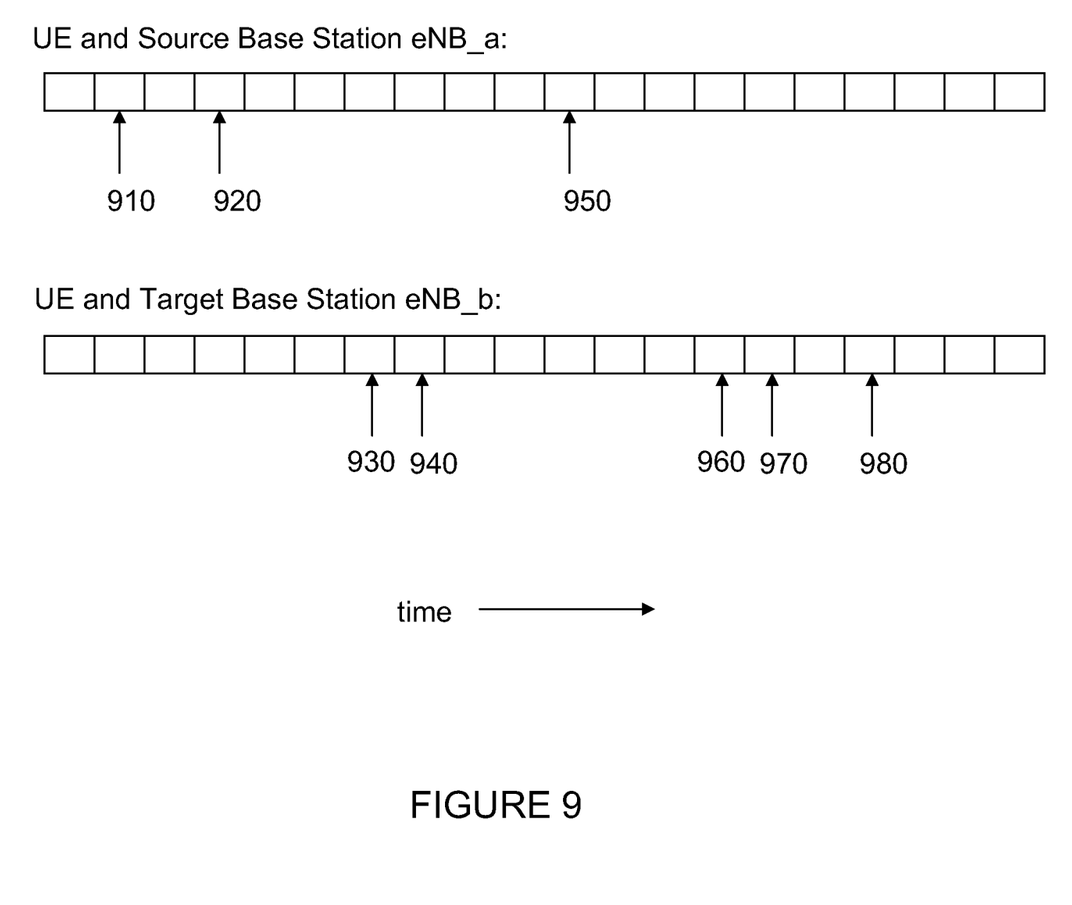
FIG. 9 illustrates a diagram of an embodiment showing sequences of processing steps in both user equipment and in an associated base station along a horizontal time axis in conjunction with a handover event in source and target cells, demonstrating the principles of the present invention.

Turning now to FIG. 9, illustrated is a diagram of an embodiment showing sequences of processing steps in both user equipment and in an associated base station along a horizontal time axis in conjunction with a handover event in source and target cells, demonstrating the principles of the present invention. In a first step 910, a measurement report is transmitted by the user equipment (designated "UE") to a source base station (designated "eNB_a"). In a second step 920, the source base station determines that a handover of the user equipment will be requested from a target base station (designated "eNB_b"). In a third step 930, the target base station checks admissibility of resources for the proposed handover, etc. In a fourth step 940, the target base station transmits a confirmation message for the handover event including further handover information to the source base station. In a fifth step 950, the source base station transmits a handover command to the user equipment that will be handed over to the target base station. In a sixth step 960, the target base station initiates allocation of uplink resources to the incoming user equipment. In a seventh step 970, the user equipment switches to the target base station. In an eighth step 980, the user equipment transmits access bursts in an uplink message to the target base station.

A handover from a source base station to a target base station is thus performed as described hereinabove without contention for resources among multiple user equipment. The system as described herein advantageously eliminates a need to know a system frame number of a target base station at the expense of a minor amount of unused uplink shared channel resources. Using the non-contention based handover principle, a shorter access procedure in a target base station can be realized compared to a contention-based handover procedure. The system further enables less complex prediction of handover interrupt time and overall handover execution time. In addition, there is little need to use an allocation table or a physical downlink control channel for allocation of the uplink handover resources for transmitting access bursts. Although the system has been described with reference to a base station in 3GPP LTE, application to other communication systems including cellular communication systems is well within the broad scope of the present invention.

Thus, the present invention describes a method for use with a communication system that includes transmitting a handover request for the user equipment from the source base station to the target base station (e.g., generated by a radio resource control/radio resource management system) and determining if the target base station has sufficient resources to accommodate the user equipment (e.g., by an admission control system). The method also includes allocating a resource in an uplink shared channel in the target base station for use by the user equipment to transmit access bursts (e.g., by a radio resource control/radio resource management system and packet scheduler) and transmitting a message from the target base station to the source base station confirming the handover including the resource in the uplink shared channel. The method also includes receiving at the source base station the message from the target base station confirming the handover, forwarding the message by the source base station to the user equipment and receiving at the user equipment the message from the source base station. The method continues by transmitting access bursts by the user equipment to the target base station, receiving at the target base station the access bursts from the user equipment, and allocating further uplink resources in the target base station for the user equipment (e.g., by a radio resource control/radio resource management system and packet scheduler).

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to advantageously coordinate allocation of resources for user equipment to be handed over from a source base station to a target base station without contention and without a need for sharing timing information therebetween, as described herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
    at least one data processor; and
    at least one memory including computer program code, where the at least one memory and the computer program code are configured, with the at least one data processor, to cause the apparatus to at least:
    communicate with a source base station;
    produce a measurement report based at least in part on a signal received from said source base station, initiate transmission of said measurement report to said source base station;
    process a handover command received from said source base station, said handover command comprising information about a reserved window of time; and
    enable transmission of access bursts to a target base station in said reserved window of time on an uplink shared channel.

2. The apparatus according to claim 1 wherein said measurement report includes a received signal amplitude and a signal transport delay.

3. The apparatus according to claim 1 wherein said access bursts are at least in part based on a cell-specific radio network temporary identifier for said apparatus, an uplink power level for said transmission provided by said target base station, or a dedicated preamble employable with a random access channel procedure in a target cell.

4. The apparatus according to claim 1 wherein said access bursts are transmitted in said reserved window of time with a designated starting time.

5. The apparatus according to claim 1 wherein said access bursts are transmitted on said uplink shared channel until one of an acknowledgement is received from said target base station, a timeout period expires and a predetermined number of access bursts has been transmitted.

6. A non-transitory computer-readable medium bearing computer program code, the computer program code executed by at least one data processor to perform operations comprising:
    producing a measurement report based at least in part on a signal received from a source base station;
    initiating transmission of said measurement report to said source base station; and
    processing a handover command received from said source base station, said handover command comprising information about a reserved window of time; and
    enabling transmission of access bursts to a target base station in said reserved window of time on an uplink shared channel.

7. The non-transitory computer readable medium according to claim 6 wherein said access bursts are transmitted on said uplink shared channel until one of an acknowledgement is received from said target base station, a timeout period expires, or a predetermined number of access bursts has been transmitted.

8. A method, comprising:
    producing a measurement report based at least in part on a signal received from a source base station;
    initiating transmission of said measurement report to said source base station;
    processing a handover command received from said source base station, said handover command comprising information about a reserved window of time; and
    enabling transmission of access bursts to a target base station in said reserved window of time on an uplink shared channel.

9. The method according to claim 8 wherein said access bursts are at least in part based on a cell-specific radio network temporary identifier for a user equipment, an uplink power level for said transmission provided by said target base station or a dedicated preamble employable with a random access channel procedure in a target cell.

10. The method according to claim 8 wherein said access bursts are transmitted in said reserved window of time with a designated starting time.

11. An apparatus, comprising:
    at least one data processor; and
    at least one memory including computer program code, where the at least one memory and the computer program code are configured, with the at least one data processor, to cause the apparatus to at least:
    determine if said apparatus has sufficient resources to accommodate user equipment and reserve a window of time on an uplink shared channel for said user equipment to transmit access bursts; and
    transmit a message to a source base station confirming handover of said user equipment associated therewith, said message comprising information about said reserved window of time.

12. The apparatus according to claim 11 wherein said at least one memory including computer program code is configured, with said at least one data processor, to cause the apparatus to allocate a cell-specific radio network temporary identifier, an uplink power level to be used by said user equipment, or a dedicated preamble employable with a random access channel procedure in a target cell.

13. The apparatus according to claim 11 wherein said message to said source base station confirming handover of said user equipment further comprises pre-allocation uplink information for said user equipment.

14. The apparatus according to claim 11 wherein said at least one memory including said computer program code is configured, with said at least one data processor, to cause the apparatus to receive said access bursts from said user equipment until one of an acknowledgement is sent to said user equipment, a timeout period expires and a predetermined number of access bursts has been transmitted.

15. The apparatus according to claim 11 wherein said at least one memory including said computer program code is configured, with said at least one data processor, to cause the apparatus to reserve future uplink allocations for incoming handover of other user equipment.

16. A method, comprising:
  determining if a target base station has sufficient resources to accommodate user equipment;
  reserving a window of time on an uplink shared channel for said user equipment to transmit access bursts; and
  transmitting a message to a source base station confirming handover of said user equipment associated therewith, said message comprising information about said reserved window of time.

17. The method according to claim 16 wherein said reserving further comprises a cell-specific radio network temporary identifier, an uplink power level to be used by said user equipment, or a dedicated preamble employable with a random access channel procedure in a target cell.

18. The method according to claim 16 wherein said message to said source base station confirming handover of said user equipment further comprises pre-allocation uplink information for said user equipment.

19. The method according to claim 16 further comprising reserving future uplink allocations for incoming handover of other user equipment.

20. A communication system, comprising:
  a source base station, including:
    a measurement report handler configured to process a measurement report from user equipment, and
    a handover subsystem configured to select a target base station for a handover of said user equipment and to generate a handover request for said user equipment to said target base station; and
  a target base station, including:
    a packet scheduler configured to determine if said target base station has sufficient resources to accommodate said user equipment and reserve a window of time on an uplink shared channel for said user equipment to transmit access bursts, and
    a handover subsystem configured to transmit a message to said source base station confirming a handover of said user equipment, said message comprising information about said reserved window of time.

* * * * *